(12) United States Patent
Wild

(10) Patent No.: US 10,782,845 B2
(45) Date of Patent: Sep. 22, 2020

(54) MEANS OF TRANSPORTATION, USER INTERACE AND METHOD FOR DEFINING A TILE ON A DISPLAY DEVICE

(71) Applicant: VOLKSWAGEN AG, Wolfsburg (DE)

(72) Inventor: Holger Wild, Berlin (DE)

(73) Assignee: VOLKSWAGEN AG, Wolfsburg (DE)

( * ) Notice: Subject to any disclaimer, the term of this patent is extended or adjusted under 35 U.S.C. 154(b) by 180 days.

(21) Appl. No.: 15/538,845

(22) PCT Filed: Dec. 18, 2015

(86) PCT No.: PCT/EP2015/080632
§ 371 (c)(1),
(2) Date: Jun. 22, 2017

(87) PCT Pub. No.: WO2016/107771
PCT Pub. Date: Jul. 7, 2016

(65) Prior Publication Data
US 2019/0155455 A1 May 23, 2019

(30) Foreign Application Priority Data

Jan. 2, 2015 (EP) .................................... 15150032

(51) Int. Cl.
*G06F 3/0481* (2013.01)
*B60K 37/06* (2006.01)
(Continued)

(52) U.S. Cl.
CPC ............ *G06F 3/0481* (2013.01); *B60K 35/00* (2013.01); *B60K 37/06* (2013.01); *G06F 3/017* (2013.01);
(Continued)

(58) Field of Classification Search
CPC .. G06F 3/0482; G06F 3/0488; G06F 3/04883; G06F 3/04886; G06F 3/0416;
(Continued)

(56) References Cited

U.S. PATENT DOCUMENTS 9,104,290 B2 * 8/2015 Yang ..................... G06F 3/0481
2009/0031247 A1 1/2009 Walter et al.
(Continued)

FOREIGN PATENT DOCUMENTS

CN 102830900 A 12/2012
DE 102008048825 A1 3/2010
(Continued)

OTHER PUBLICATIONS

PCT International Search Report and Written Opinion completed by the ISA/EP dated Apr. 4, 2016 and issued in connection with PCT/EP2015/080632.
(Continued)

*Primary Examiner* — Nicholas Ulrich
(74) *Attorney, Agent, or Firm* — Barnes & Thornburg LLP

(57) ABSTRACT

The present disclosure relates to a transportation vehicle, a user interface, and a method for defining a tile on a displace device of a user interface. The method may include the following steps: displaying a tile grid comprising a number of cells on the display device in an operating mode; detecting a user gesture, in particular a swiping gesture, in contact with a touch-sensitive surface in relation to at least one cell; and, in response, defining a tile on the positions of those cells that have been dialed by the user gesture in a predefined manner.

20 Claims, 17 Drawing Sheets

(51) Int. Cl.
*G06F 3/0488* (2013.01)
*B60K 35/00* (2006.01)
*G06F 3/01* (2006.01)
*G06F 9/451* (2018.01)
*G06F 3/0482* (2013.01)

(52) U.S. Cl.
CPC ........ *G06F 3/0482* (2013.01); *G06F 3/04886* (2013.01); *G06F 9/451* (2018.02); *B60K 2370/146* (2019.05); *B60K 2370/1438* (2019.05); *B60K 2370/1442* (2019.05); *B60K 2370/52* (2019.05); *G06F 2203/04803* (2013.01)

(58) Field of Classification Search
CPC .. G06F 3/017; G06F 3/04842; G06F 3/04845; G06F 3/04847; G06F 9/451; G06F 2203/04803; G06F 3/0484; G06F 3/0481; B60K 2350/1024; B60K 2350/1028; B60K 2350/1004; B60K 2350/908; B60K 2350/1052; B60K 35/00
See application file for complete search history.

(56) References Cited

U.S. PATENT DOCUMENTS

| | | | |
|---|---|---|---|
| 2009/0132942 A1 | 5/2009 | Santoro et al. | |
| 2012/0176382 A1* | 7/2012 | Noh | G06F 3/0488 345/428 |
| 2014/0189482 A1* | 7/2014 | Hill | G06F 3/04883 715/212 |
| 2014/0282166 A1* | 9/2014 | Temkin | G06F 3/04845 715/769 |
| 2015/0007078 A1 | 1/2015 | Feng et al. | |
| 2015/0082211 A1* | 3/2015 | Lee | G06F 3/04845 715/763 |
| 2015/0113428 A1* | 4/2015 | Liu | G06F 3/04817 715/745 |
| 2016/0062607 A1* | 3/2016 | Lunceford | G06F 16/21 715/845 |

FOREIGN PATENT DOCUMENTS

| | | |
|---|---|---|
| EP | 2466456 A1 | 6/2012 |
| WO | 2014/000445 A1 | 1/2014 |
| WO | 2014051628 A1 | 4/2014 |
| WO | 2014146925 A1 | 9/2014 |

OTHER PUBLICATIONS

European Search Report and Opinion dated May 26, 2015 and issued in connection with EP Patent Application No. 15150032.9.
Search Report for European Patent Application No. 15150032.9; dated Nov. 21, 2018.
Office Action for Korean Patent Application No. 10-2017-7018894; dated Jul. 20, 2018.
Office Action for Chinese Patent Application No. 201580071911.6; dated Oct. 25, 2019.

* cited by examiner

MEANS OF TRANSPORTATION, USER INTERACE AND METHOD FOR DEFINING A TILE ON A DISPLAY DEVICE

CROSS-REFERENCE TO RELATED APPLICATIONS

This application is a national stage entry under 35 USC § 371 of PCT International Application No. PCT/EP2015/080632, filed Dec. 18, 2015, and claims the benefit under 35 USC § 119(e) to European Patent Application Number 15150032.9, filed Jan. 2, 2015.

SUMMARY

The present disclosure relates to a means of transportation such as a transportation vehicle, to a user interface, and to a method for defining a tile on a display device of a user interface. In particular, the present disclosure relates to intuitive and simple adaptations of a position and/or of a variable and/or of a format of a tile.

BRIEF DESCRIPTION OF DRAWINGS

Exemplary embodiments of the present invention will be described below with reference to the appended figures in the drawings, in which.

DETAILED DESCRIPTION OF THE DISCLOSED EMBODIMENTS

Figure 1:
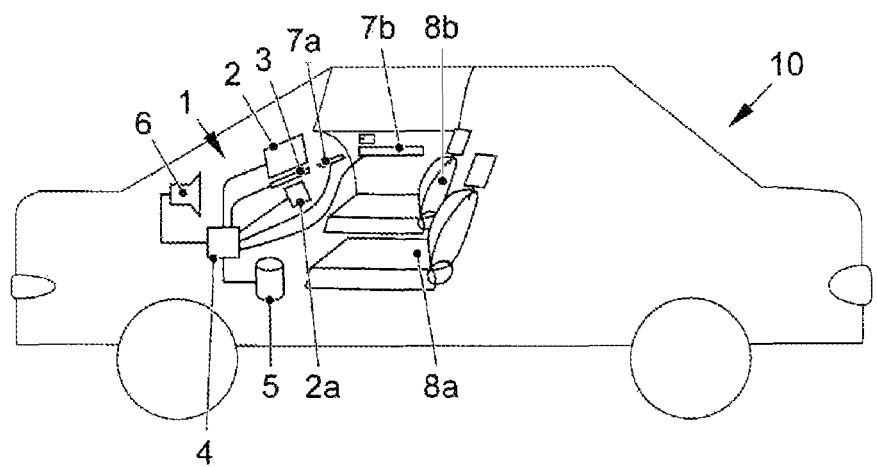
FIG. 1 is a schematic overview of components of an exemplary embodiment of a means of transportation according to the present disclosure with an exemplary embodiment of a user interface according to the present disclosure.

An object of the present disclosure is to make available a simple possible way of defining positions and sizes for tiles on a user interface. The object is achieved by means of a method for defining a tile on a display device of a user interface. The display device may be, for example, a matrix display on which optional contents can be displayed. In particular, the display device can be provided for continuous integration into the dashboard of a means of transportation in mechanical and information technology terms. A "tile" is understood within the scope of the present disclosure to be such a field or such a meaningful unit of a graphic user interface on which functions and/or functional scopes and/or information scopes and/or operator control possibilities are combined to form one functional family and are delimited visually and logically from other information scopes on the screen. In particular, tiles can contain functional scopes defined by the user. In a first step, a tile grid comprising a plurality of cells is displayed on the display device. A "tile grid" is understood within the scope of the present disclosure to be a visual orientation for the user as to the positions at which boundary lines can be arranged between tiles. Different functions cannot be assigned to the cells. They serve merely to define tiles. The tile grid is to be differentiated from a pixel grid of a display device which does not predefine any esthetic grating for different tiles. In particular, the tile grid can predefine matrix-like basic values for edge lengths of the tiles to be defined. Therefore, the smallest elements of a tile grid can be larger than the smallest elements (edge lengths) of the pixel grid of the display device. The term "cells" of the tile grid is understood to refer to the smallest possible surface regions for the definition of tiles within the tile grid. The tile grid is displayed in an operator control mode in which primary functions of the tiles which under certain circumstances have already been displayed can be accessed. In a second step, a user gesture in contact with a touch-sensitive surface relating to at least one cell is detected. By means of the user gesture, the user defines one or more cells of the tile grid which he would like to convert into a single tile. For example, in response to the ending of the contact with the touch-sensitive surface (for example the display device used) a tile is defined at the positions of those cells which have been selected by means of the user gesture. In this context, for example, a tile is produced on a single cell of the cells which are swiped over. Preferably, a multiplicity, in particular preferably all, of the cells which have been selected within the scope of the user gesture are fused to form one tile. The user gesture which is proposed may be embodied, for example, as a swiping gesture. Alternatively or additionally, a so-called "multi-touch gesture" can define a multiplicity of cells which are subsequently fused to form one tile. In particular, a respective user gesture will always define just a single tile which extends on the display device as a function of the cells which are arranged furthest apart from one another. In contrast to the prior art, a particularly simple and intuitive possible way of defining a tile is proposed which results, in particular while a means of transportation is being driven, in the smallest possible distraction of the driver from the events on the road.

For the purpose of defining content of the tile which is defined according to the present disclosure, a selection menu for defining content to be displayed in the tile can be displayed automatically in response to the definition of the tile. In other words, a selection of available functional scopes which the user can assign to the tile can be displayed in response to the ending of the user gesture provided.

Alternatively, the selection menu which is described above for defining the content to be displayed in the tile can be displayed in response to the detection of a tapping gesture relating to the defined tile.

In order to definitively assign content to the tile, the user can select a contribution in the selection menu in response to which the finished tile displays the authorized information scope and makes available possibly included control buttons for receiving user inputs.

The selection gesture for selecting an entry in the selection menu can comprise, for example, a tapping gesture on the entry. Alternatively or additionally, a swiping gesture can comprise relating to the entry with the target of the area on the previously defined tile. In other words, a drag/drop gesture is executed which drops the entry onto the defined tile.

Depending on how many functional scopes are made available for the defined tile, it may be advantageous to display, during the selection of an entry in the selection menu, functional scopes in the form of a selection submenu, which are subordinate to the entry. The selection submenu may be, for example, "folded out" in response to a tapping gesture on a respective entry. As described above, a selection gesture relating to an entry in the selection submenu can then define corresponding content for the tile.

The present disclosure also proposes user steps which are intuitive and easy to carry out for a case in which a tile which has already been successfully defined is to be shifted to another position and/or is to be displayed with a different size and/or a different edge length ratio. For example, the user can carry out a gesture with a minimum contact duration (referred to as "longpress gesture") relating to the tile, as a result of which the tile is released from its previous position within the tile grid. This procedure can be clarified graphically by virtue of the fact that the tile as it were firstly "sticks" to the user's finger irrespective of the positions of the cells of the tile grid. Subsequently, a swiping gesture or a drag/drop gesture relating to the tile is detected and a new tile is defined as a function of that position of cells which has a predetermined relationship with a target position of the swiping gesture. For example, all the cells of the tile grid on which the detached tile is superimposed at the end of the contact of the user with the display device can be defined as a new position of the tile and determine the ratio of their sides. A degree of overlap between the detached tile and a cell of the tile grid can also be defined which determines whether the overlapped cell becomes part of the new tile. The degree of overlap can be described, for example, as a predetermined percentage or fraction of an overlapped edge length or of an overlapped area of the respective cell which has to be, for example, half, in particular a third, preferably a quarter of a total edge length of the cell for the cell position to be "assumed" by the tile. This can prevent inadvertently produced relatively small degrees of overlap from defining the overlapped cell as a future target position of the tile.

The tile grid which is proposed according to the present disclosure can preferably be displayed in response to detecting of a swiping gesture with a starting position on an already defined tile. In particular, the swiping gesture is not essentially horizontally directed, with the result that it differs from gestures which call a change to another screenshot (e.g. a further home screen). In this way, the tile grid is displayed for better orientation of the user only in response to the clear request by the user to modify the position/the size of the tile. Alternatively or additionally, the tile grid can already be displayed in response to the user approaching the display device, in order to ensure the earliest possible orientation of the user in relation to possible target positions/sizes.

According to a second aspect of the present disclosure, a user interface is proposed which comprises a display device (e.g. a screen), a detection device (e.g. a touch-sensitive surface and/or a sensor system for detecting user gestures executed freely in space) and an evaluation unit (e.g. comprising a programmable processor, in particular in the form of a microcontroller nanocontroller). The evaluation unit can be configured, for example, as an electronic control unit for use in an automobile. According to the present disclosure, the user interface is configured to execute a method according to the first-mentioned aspect of the disclosure. The features, combinations of features and the advantages resulting therefrom correspond to those executed in conjunction with the abovementioned method in such a clear way that reference is made to the above statements in order to avoid repetitions.

According to a third aspect of the present disclosure, a computer program product is proposed (e.g. a data memory) on which instructions are stored which enable a programmable processor (e.g. an evaluation unit) to carry out the steps of a method according to the first-mentioned aspect of the invention. The computer program product can be embodied as a CD, DVD, Blu-Ray disk, flash memory, hard disk, RAM/ROM, cache etc.

According to a fourth aspect of the present disclosure, a signal sequence representing instructions which enable a programmable processor (e.g. an evaluation unit) to carry out the steps of a method according to the first-mentioned aspect of the present disclosure is proposed. In this way, the provision of the instructions in terms of information technology is also placed under protection in the event of the memory means which are necessary for this being outside the scope of validity of the appended claims.

According to a fifth aspect of the present disclosure, a means of transportation (e.g. a passenger car, a transporter, a truck, a motorcycle, an aircraft and/or watercraft) is proposed which comprises a user interface according to the second-mentioned aspect of the present disclosure. The user interface can be provided, in particular, for the driver of the means of transportation, by means of which, while driving the means of transportation, the driver can communicate with the means of transportation and its technical devices. The features, combinations of features and the advantages resulting therefrom correspond to those implemented in conjunction with the first-mentioned aspect of the present disclosure so clearly that reference is made to the statements above in order to avoid repetitions.

FIG. 1 shows a passenger car 10 as a means of transportation in which components of an exemplary embodiment of a user interface are contained. Two screens 2, 2a are arranged one above the other in the dashboard of the passenger car 10 as a component of a display device and detection device. An infrared LED strip 3 is arranged as a further component of the detection device between the screens 2, 2a and is designed to detect user gestures (3D user inputs) executed freely in space. A data memory 5 is provided for keeping available instructions for the execution of a method according to the present disclosure and for the detection of classes of predefined user inputs and, like the abovementioned components, is also connected in terms of information technology to an electronic control unit 4 as an evaluation unit. The electronic control unit 4 additionally has a signal output to a loudspeaker 6 via which information tones and acoustic accentuations can be output for user inputs. Two ambient lighting strips 7a, 7b are let into the dashboard or into the door of the passenger car 10 and can be actuated with an optional intensity via the electronic control unit 4 in order to output an optional color of light. A driver's seat 8a and a front seat passenger's seat 8b are provided for accommodating a user of the user interface 1.

Figure 2:
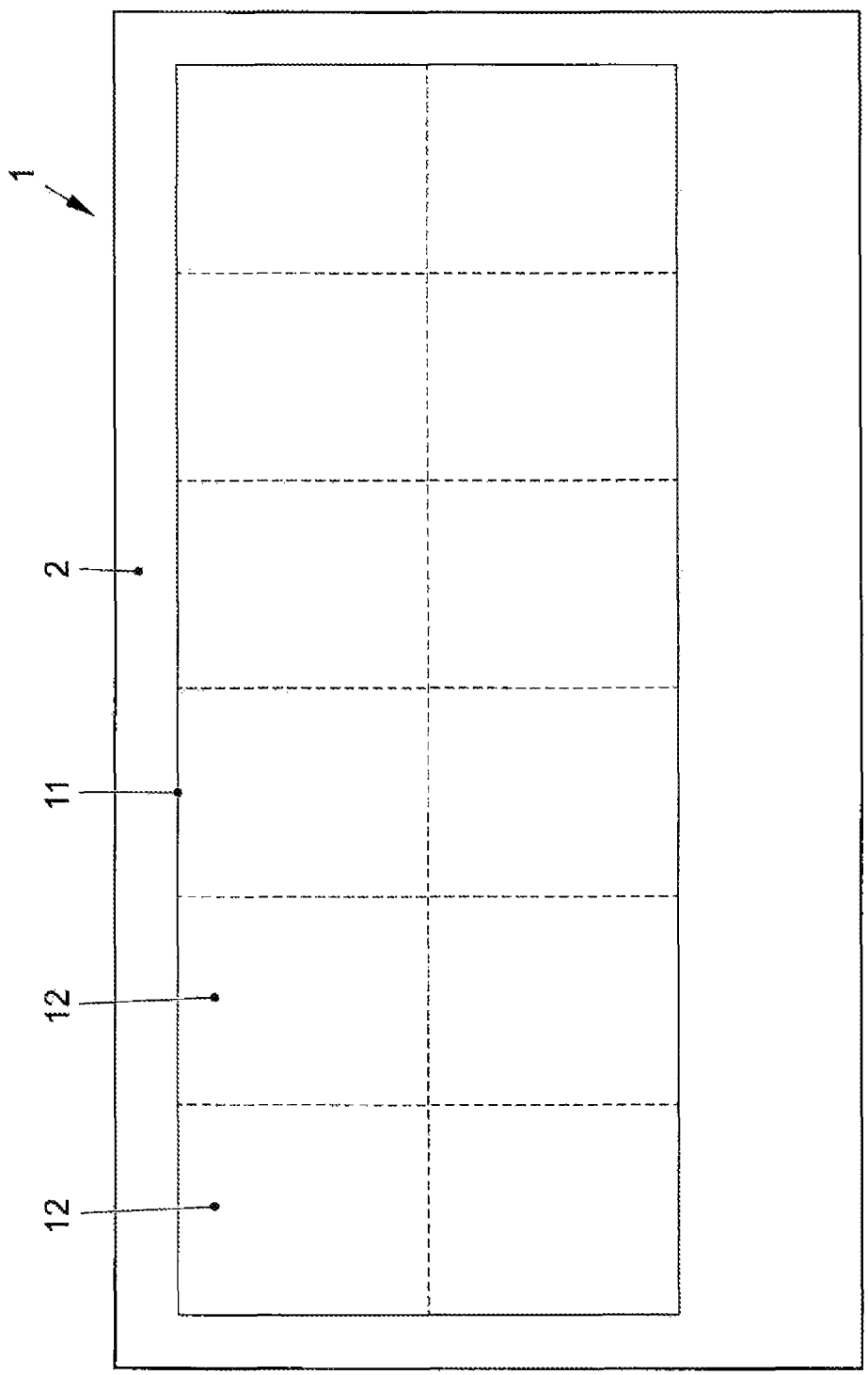
FIG. 2 is a schematic screenshot which shows a tile grid proposed according to the present disclosure.

FIG. 2 shows a possible screenshot of a screen 2 of a user interface 1 according to the present disclosure in which essentially square cells 12 are delimited from one another by dashed lines in a rectangular grid 11. The dashed lines provide the user with orientation regarding positions on the screenshot at which edge lines of definable tiles can be arranged. An information text explains the input possibility for the definition of a tile.

Figure 3:
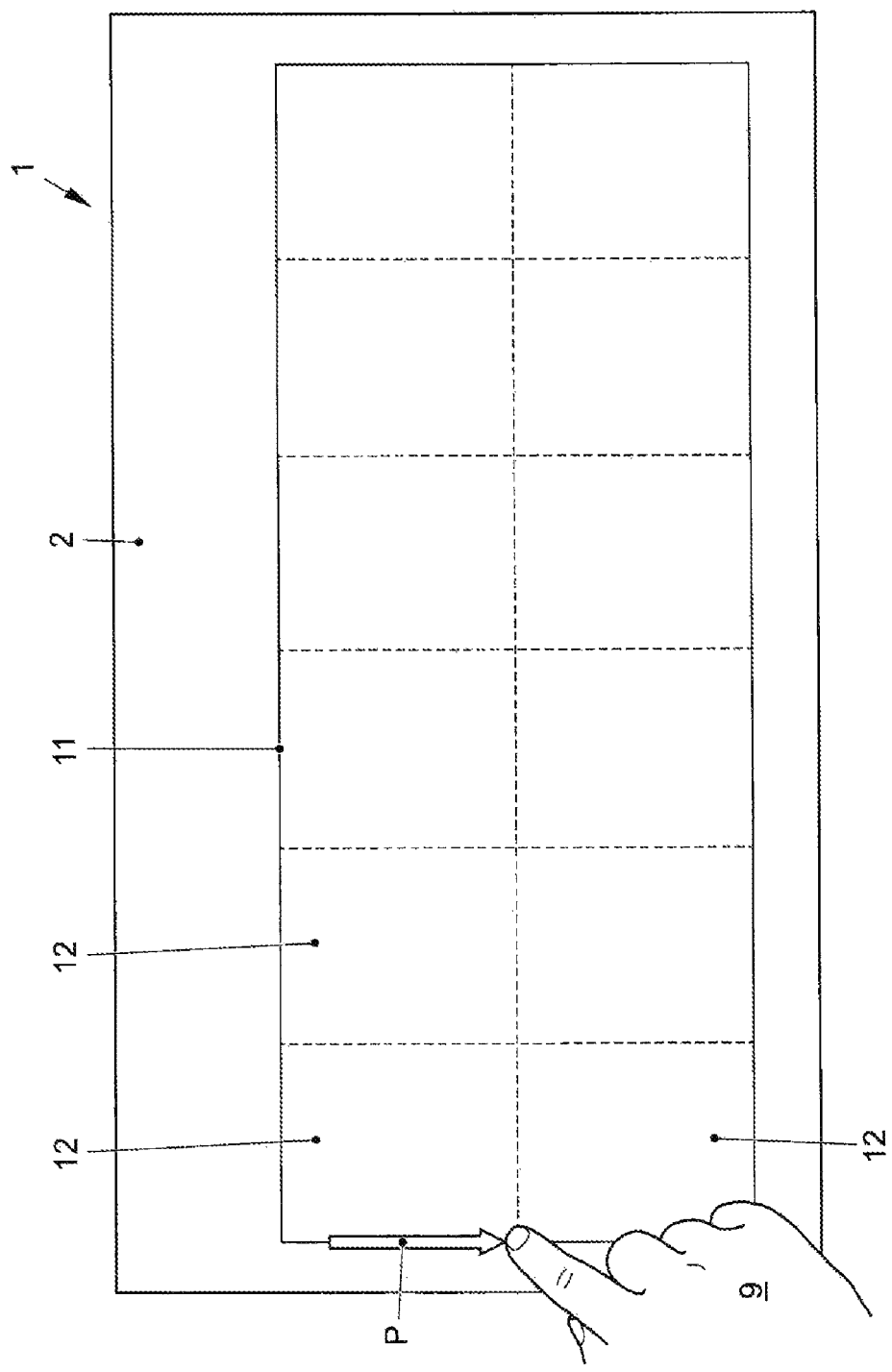
FIGS. 3, 4, and 5 are an illustration of a user interaction for defining a first tile.

FIG. 3 shows a swiping gesture of a hand 9 of a user along an arrow P on a screenshot corresponding to FIG. 2.

Figure 4:
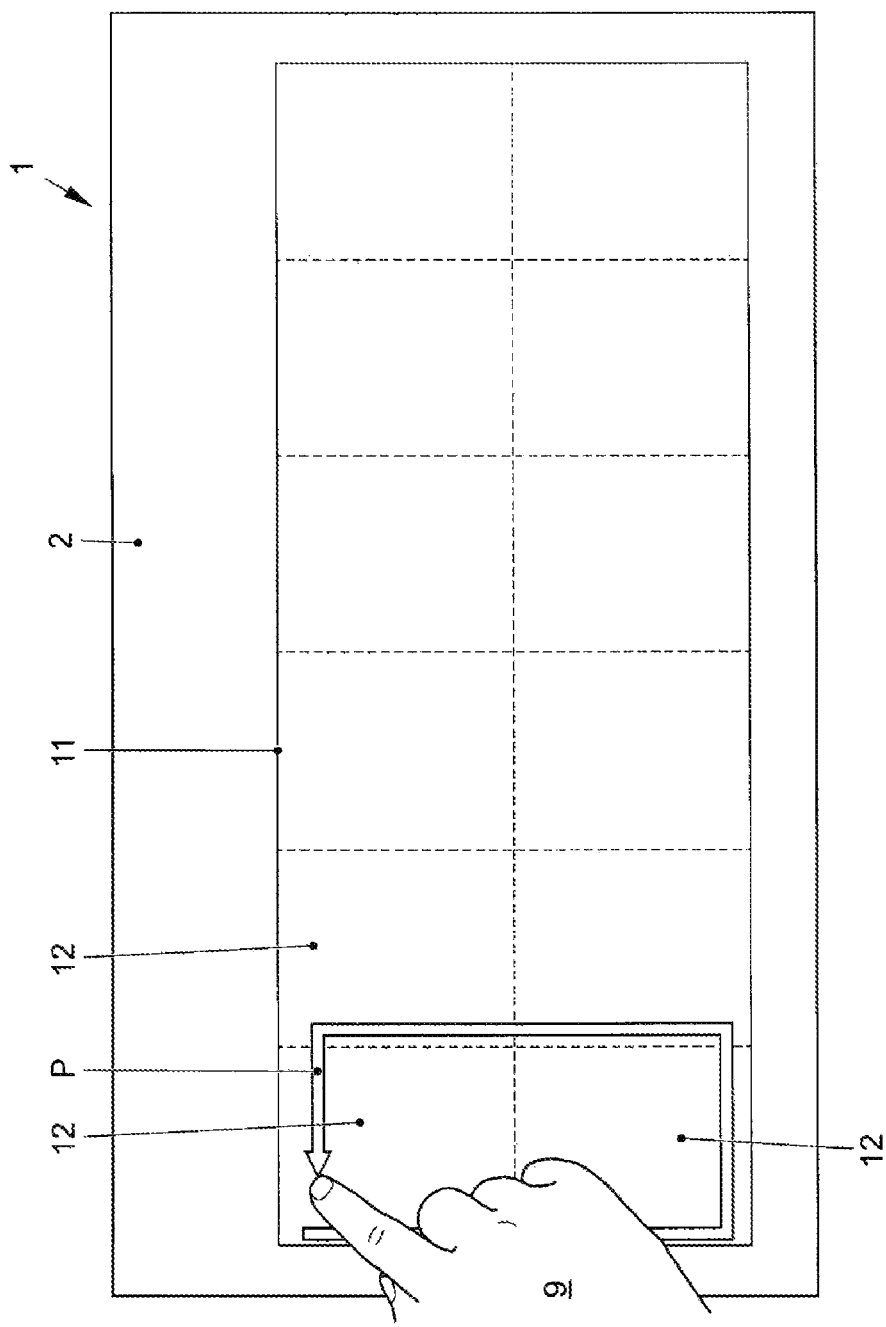

FIG. 4 shows the swiping gesture started in FIG. 3 in an advanced stage. The path along the arrow P essentially outlines the two leftmost cells 12 of the screenshot.

Figure 5:
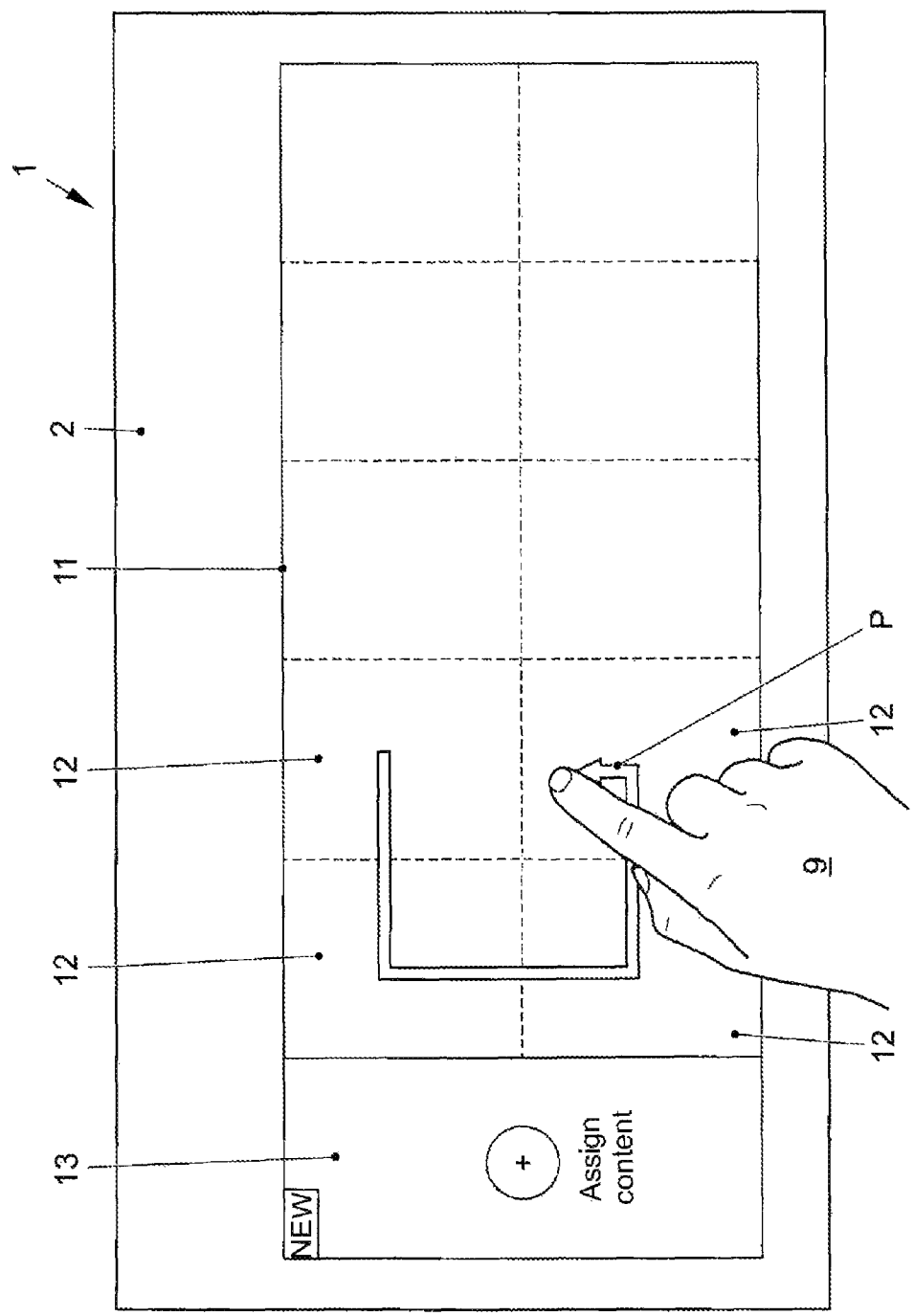

FIG. 5 shows the result of the user interaction illustrated in conjunction with FIGS. 3 and 4. The two leftmost cells have been fused to form a new tile 13 to which an information scope and functional scope can be assigned as new content via a control button (a circle with a plus sign) represented within the tile 13. A slight overlap of the respective adjacent cells (respective second cell 12 from the left, see FIG. 4) has been ignored here in order to exclude unintentional slight overlaps of the user input with cells 12 which have not been addressed by the user. In this way, only a focused or discriminating evaluation of the user gesture is carried out. Moreover, the lettering "NEW" in the top left corner indicates the status of the tile 13. In addition, FIG. 5 shows a further user interaction along an arrow P with which the user's hand 9 swipes over the four cells 12 which are closest to the tile 13.

Figure 6:
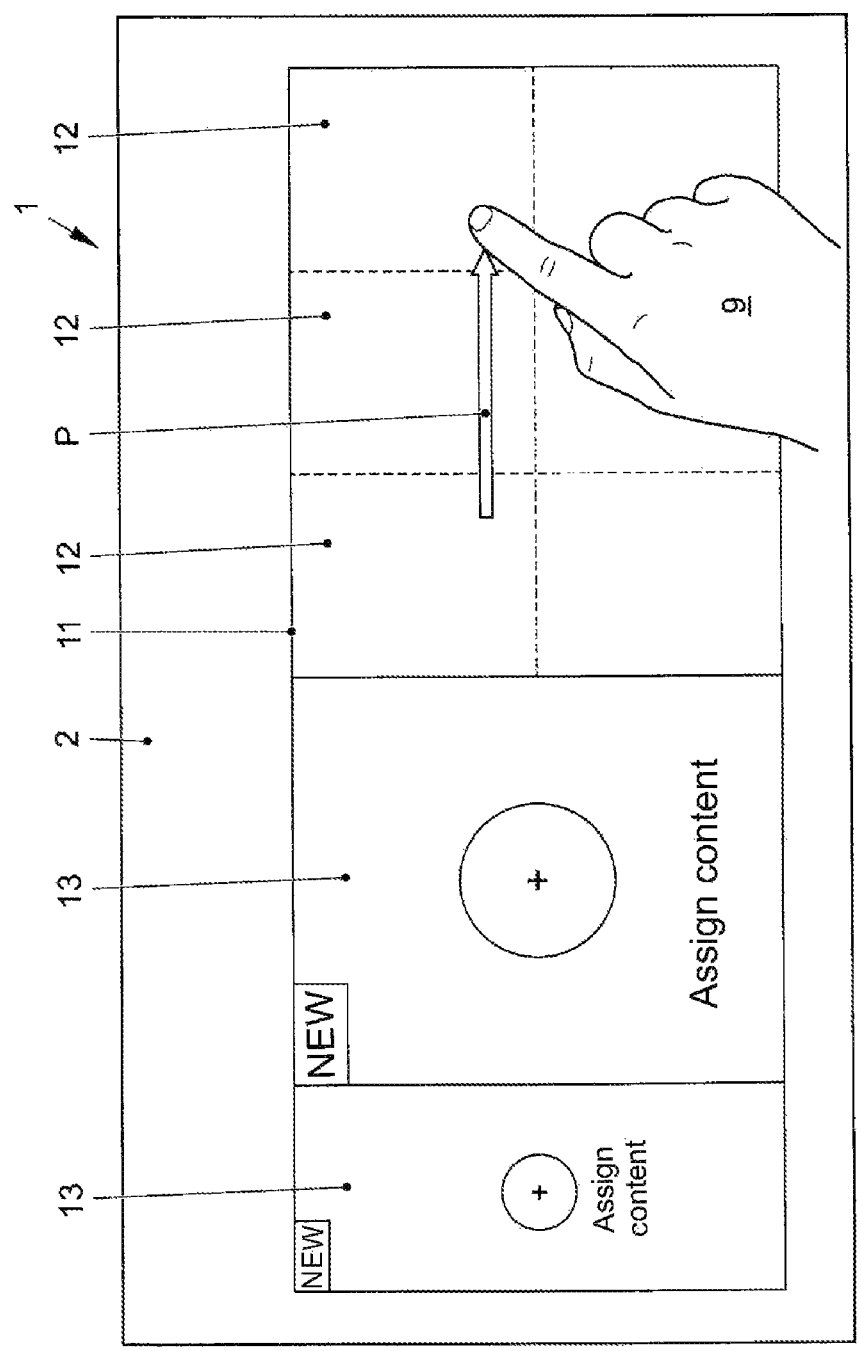
FIG. 6 provides an illustration of a result of the user interaction of FIG. 5 which includes the second user interaction for defining a second tile.

FIG. 6 shows the result of the user interaction which is illustrated in FIG. 5, for the purpose of defining a second tile 13 which has been produced by fusing four cells 12. In addition, FIG. 6 shows a swiping gesture of a hand 9 of a user along an arrow P, which gesture defines the remaining cells 12 in the top line of the grid 11 as a target position of a new tile.

Figure 7:
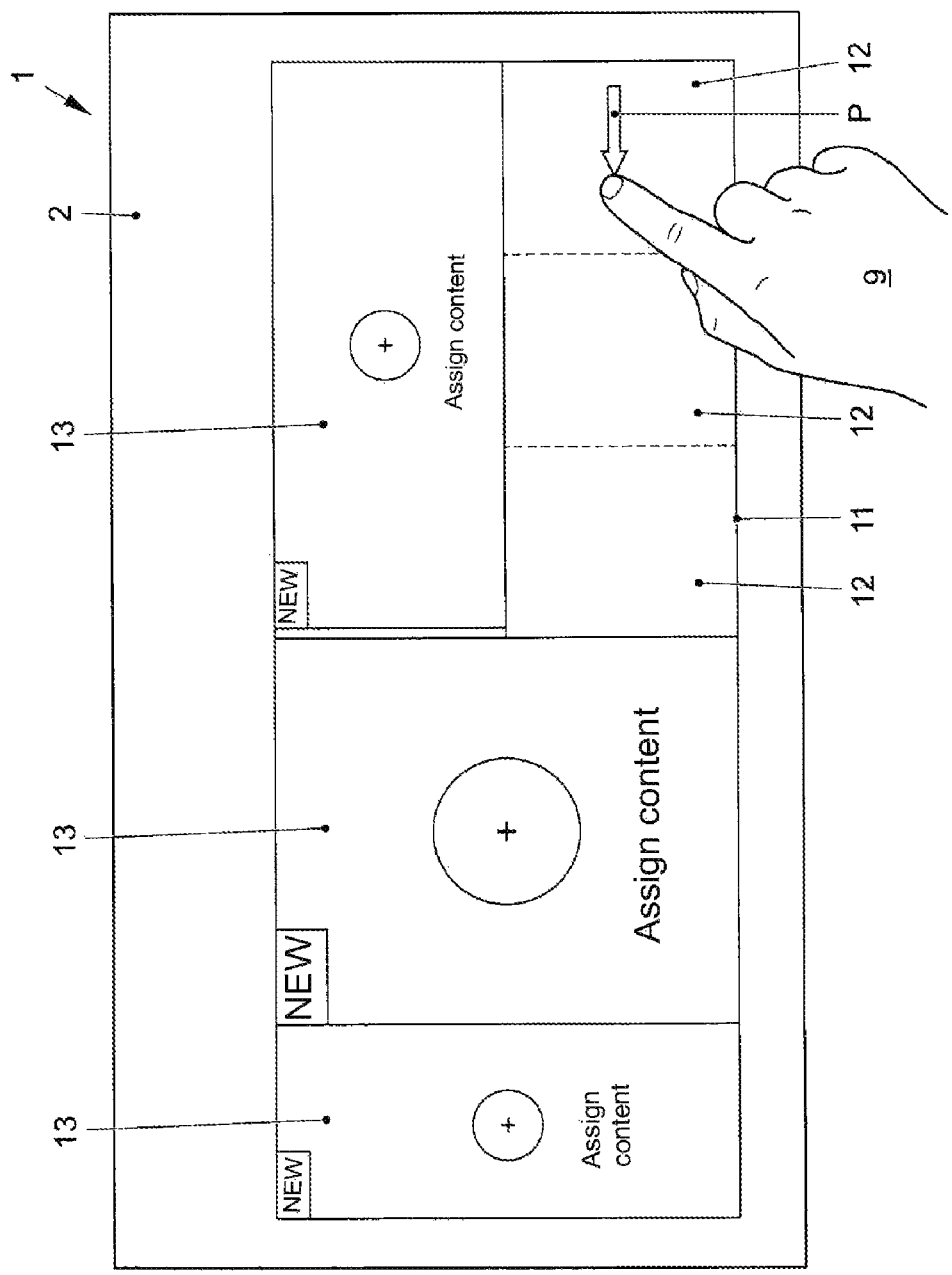
FIG. 7 provides an illustration of a result of the user interaction of FIG. 6 which includes the third user interaction for defining a third tile.

FIG. 7 shows, on the one hand, the result of the user input illustrated in FIG. 6 as well as an additional swiping gesture of the user's hand 9 along an arrow P by means of which the user defines the rightmost cell 12 in the bottom line of the grid 11 as a position of a new tile.

Figure 8:
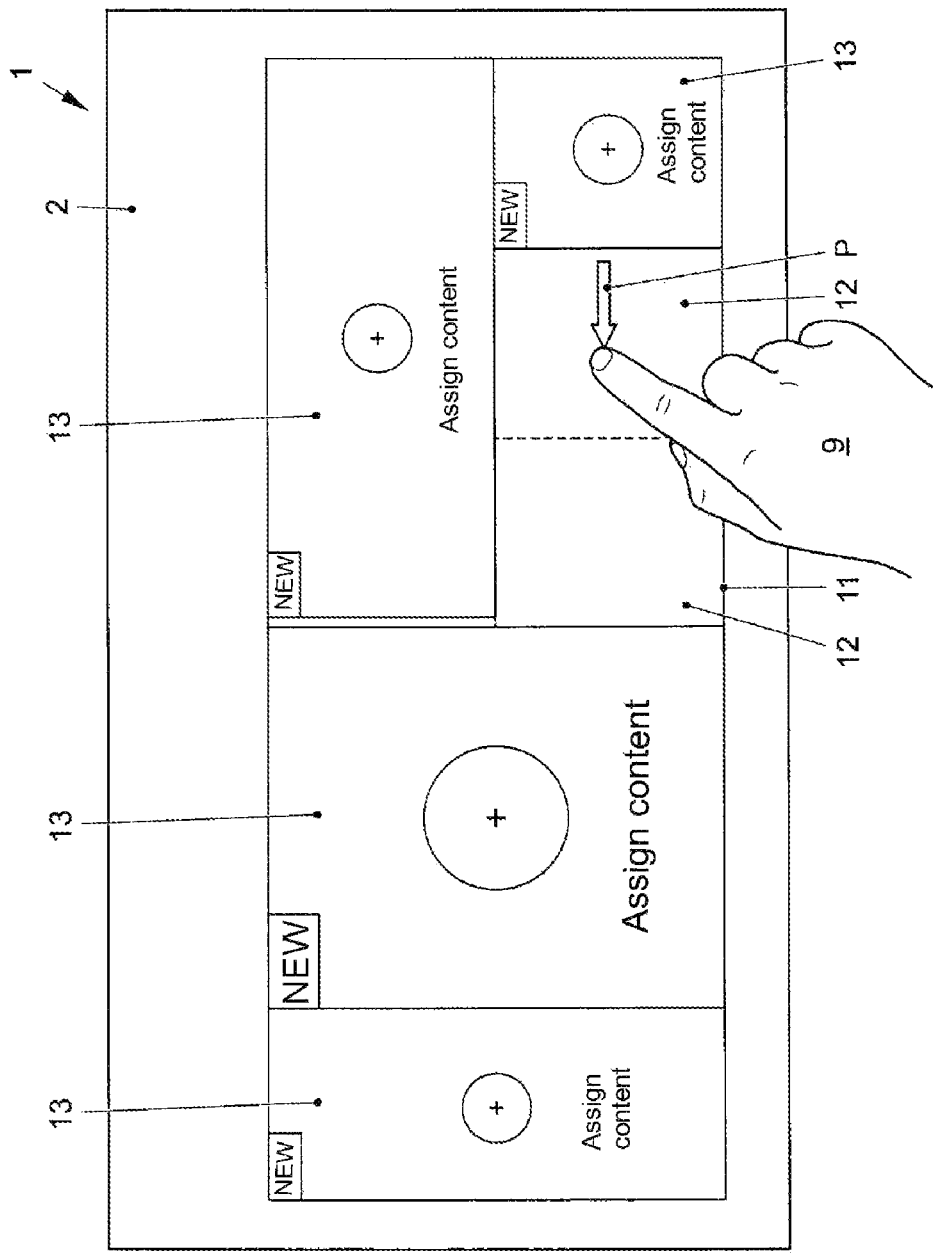
FIGS. 8 and 9 are illustration of further user interactions for defining further tiles.
Figure 9:
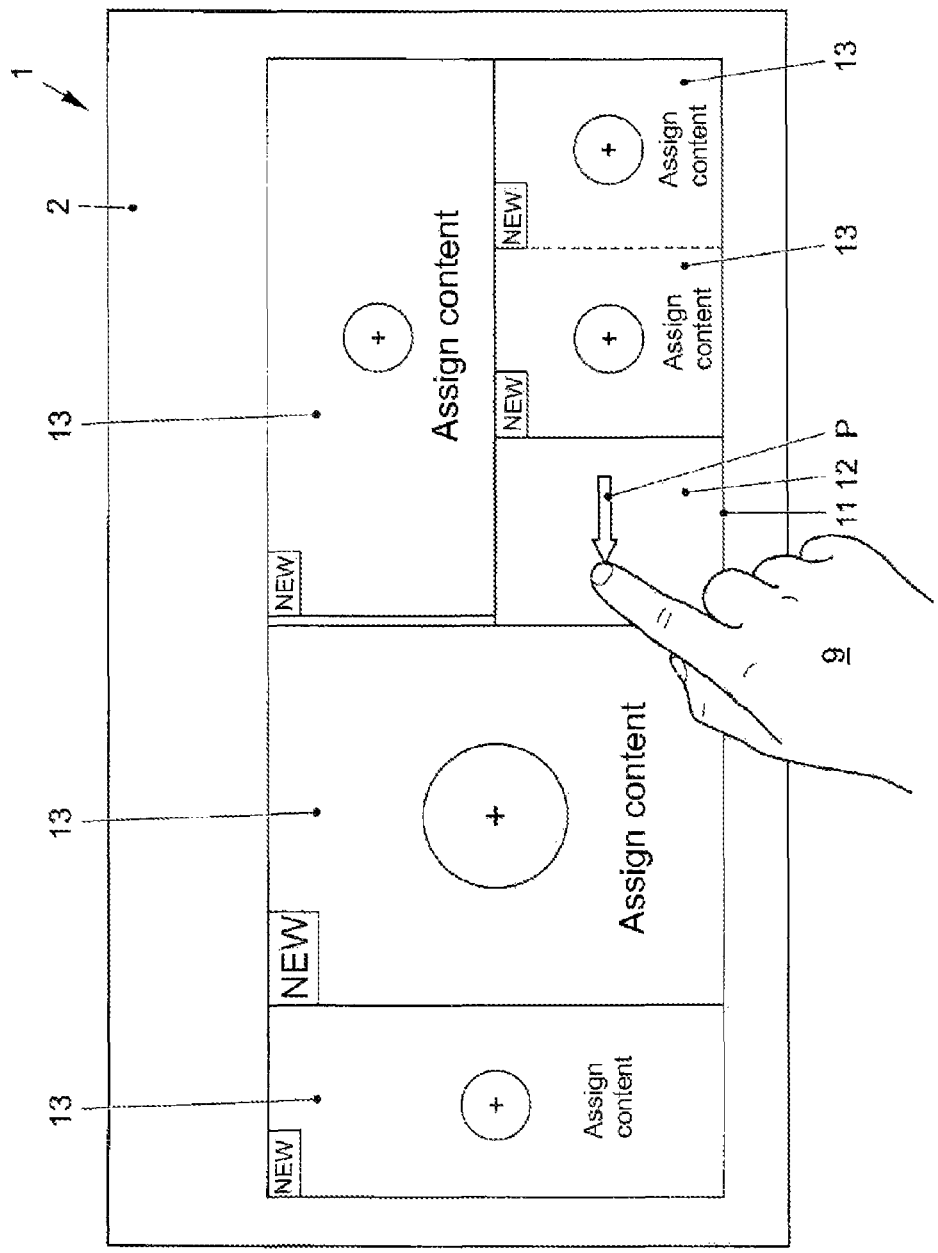

FIGS. 8 and 9 show corresponding gestures for defining two further tiles 13.

Figure 10:
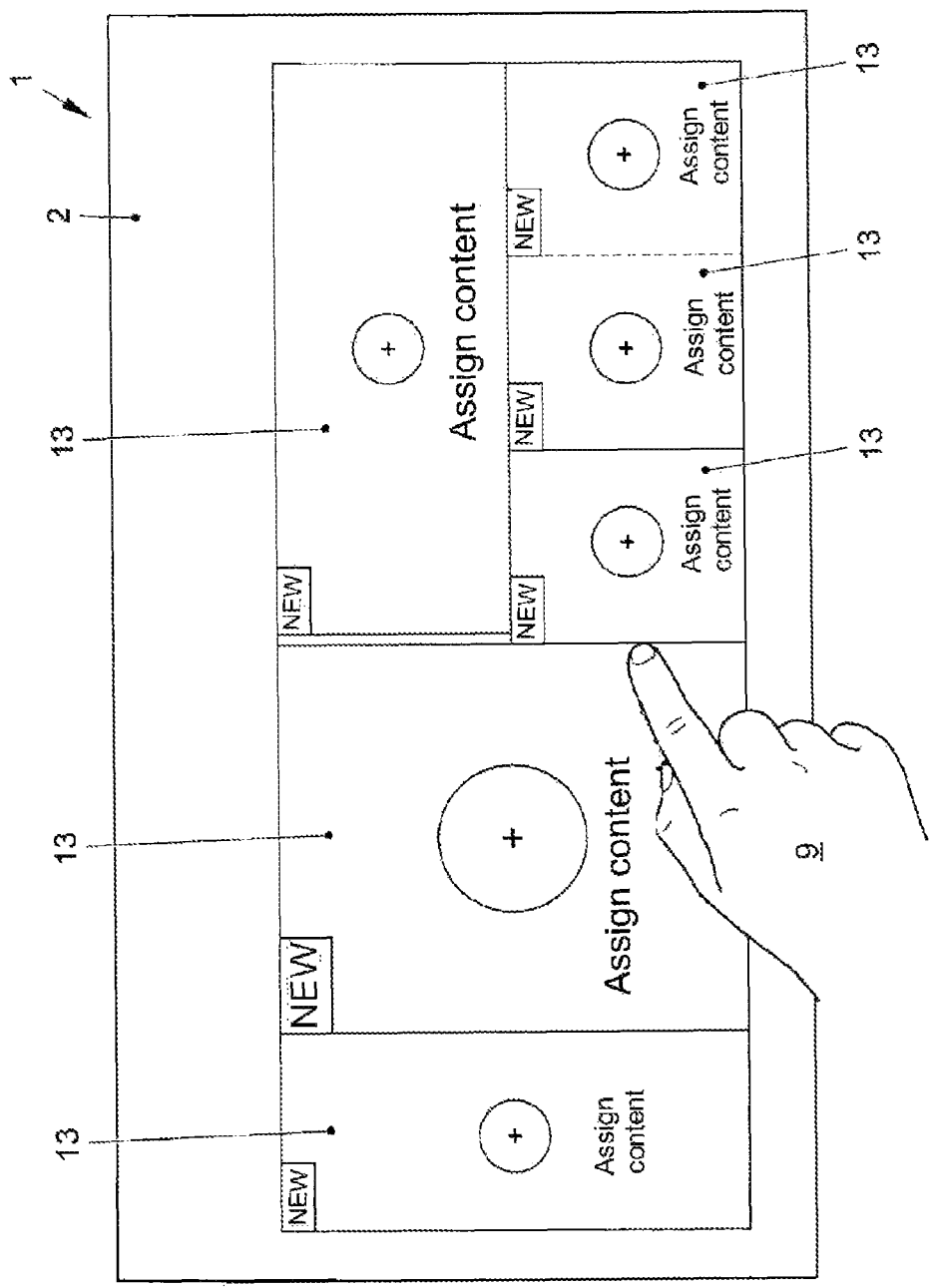
FIG. 10 shows an illustration of an additional user interaction for assigning content to the second tile.

FIG. 10 shows a tapping gesture of a user's hand 9 on a tile 13 which is entirely configured as a control button for assigning content to the tile 13.

Figure 11:
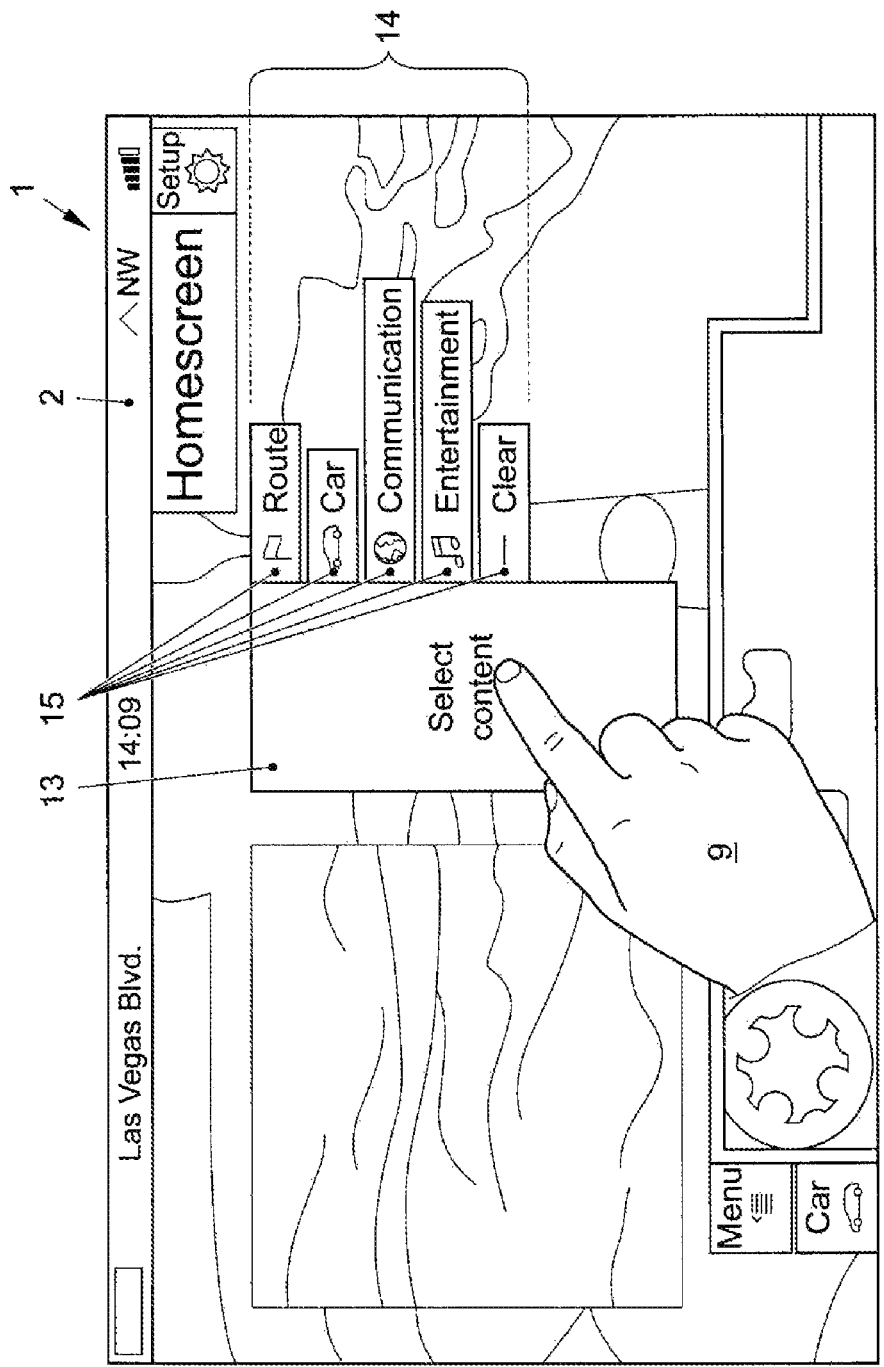
FIG. 11 is an illustration of a selection menu for defining content of a tile.

FIG. 11 shows the result of the user interaction illustrated in FIG. 10, in response to which a selection menu 14 comprising five entries 15 is displayed. The entries 15 represent from top to bottom the illustration of a route, information of the on-board computer, communication possibilities, a media playback and a control button for removing the tile 13 which is produced.

Figure 12:
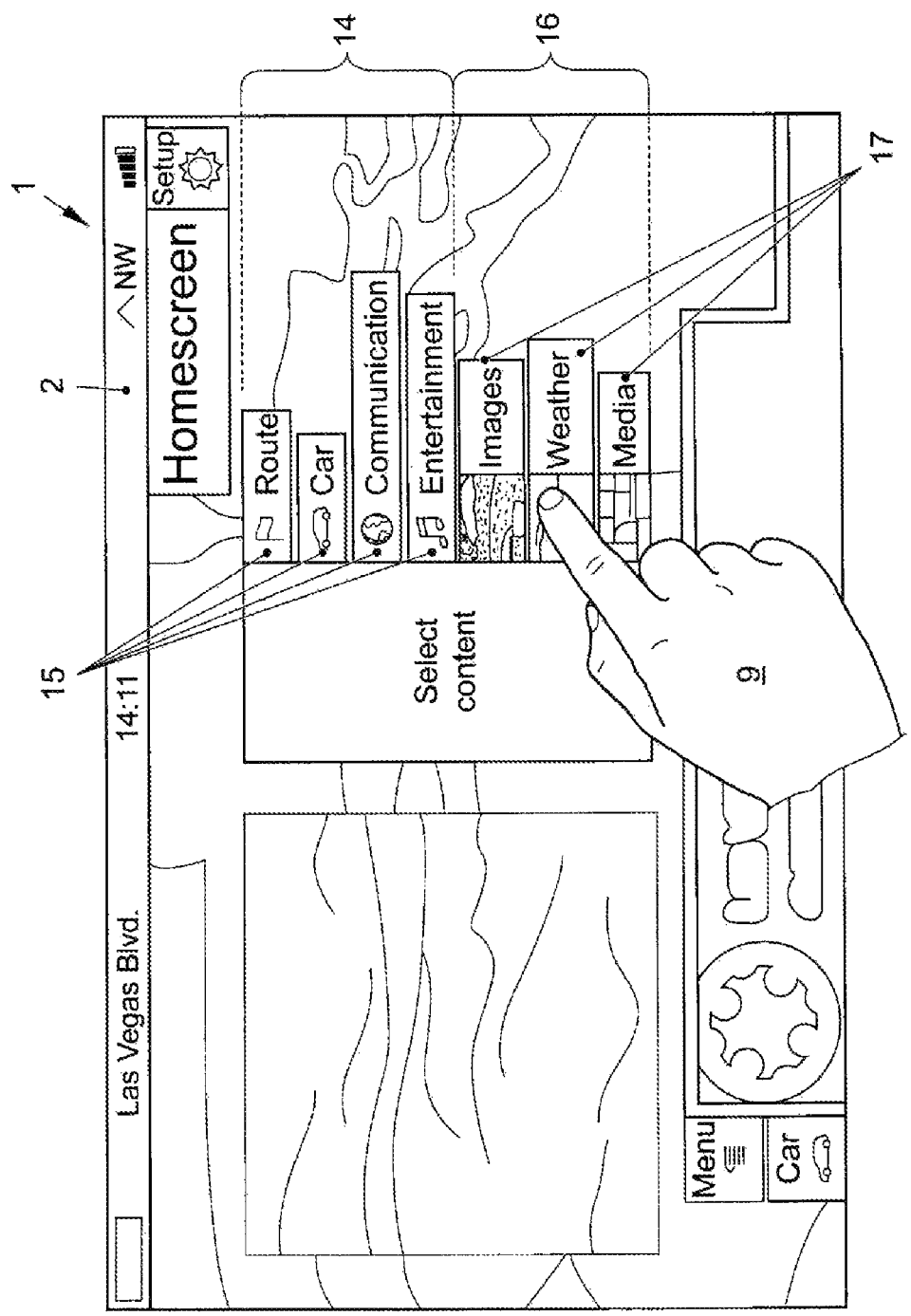
FIG. 12 is an illustration of a selection menu for defining content for a tile.

FIG. 12 shows the result of a selection of the entry 15, in response to which a selection submenu 16 with entries 17 is displayed. The entries 17 of the selection submenu represent a display of images, a display of weather information and a media playback. The user's 9 hand carries out a tapping gesture on the entry 17 in order to display the weather information.

Figure 13:
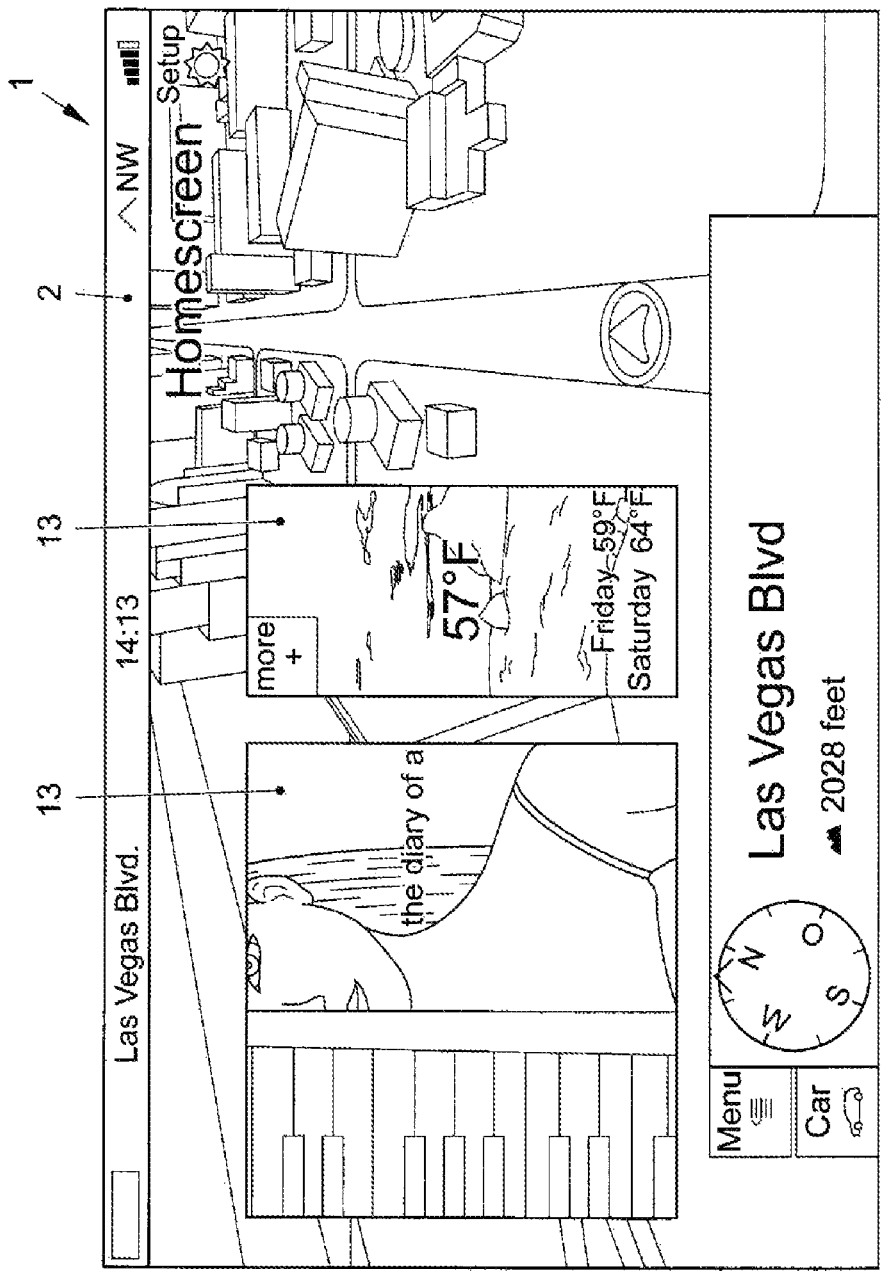
FIG. 13 is the result of the user interaction shown in FIG. 12.

FIG. 13 shows the result of the selection illustrated in FIG. 12. The recently defined tile 13 in the center of the screen now shows weather information (temperatures) for the current day and two following days.

Figure 14:
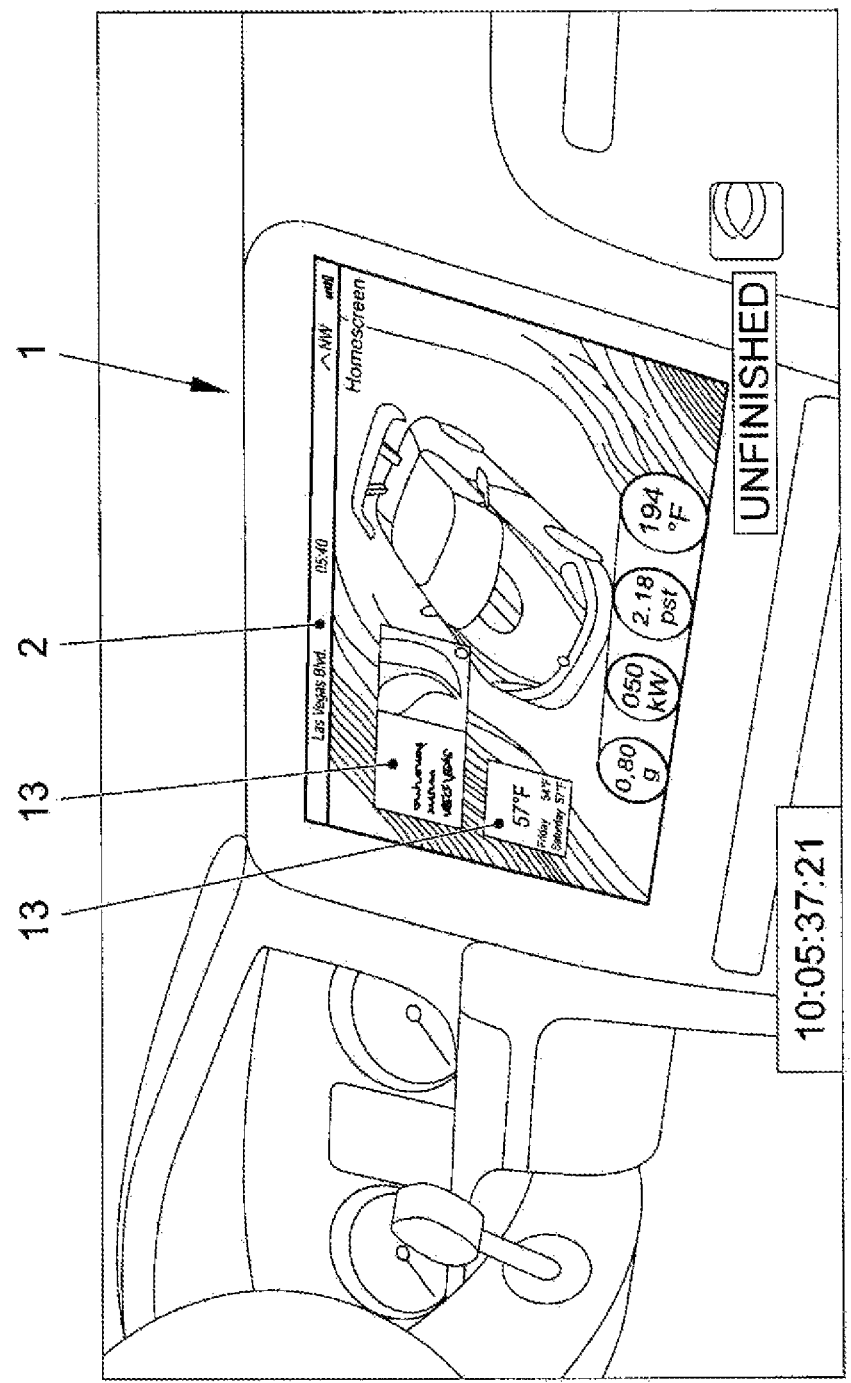
FIG. 14 is a perspective view of a user interface with tiles in a display mode.

FIG. 14 shows a perspective view of a user interface 1 with a screen 2 which is let into a dashboard of a means of transportation. The screen content shows two tiles 13 which have already been defined, in a display mode. A tile grid proposed according to the present disclosure is not displayed at first. The two tiles 13 which are represented one on top of the other are at a predefined distance from one another so that components of the background of the screen ("wallpaper") ensure a visual delimitation of the functional scopes represented by the tiles.

Figure 15:
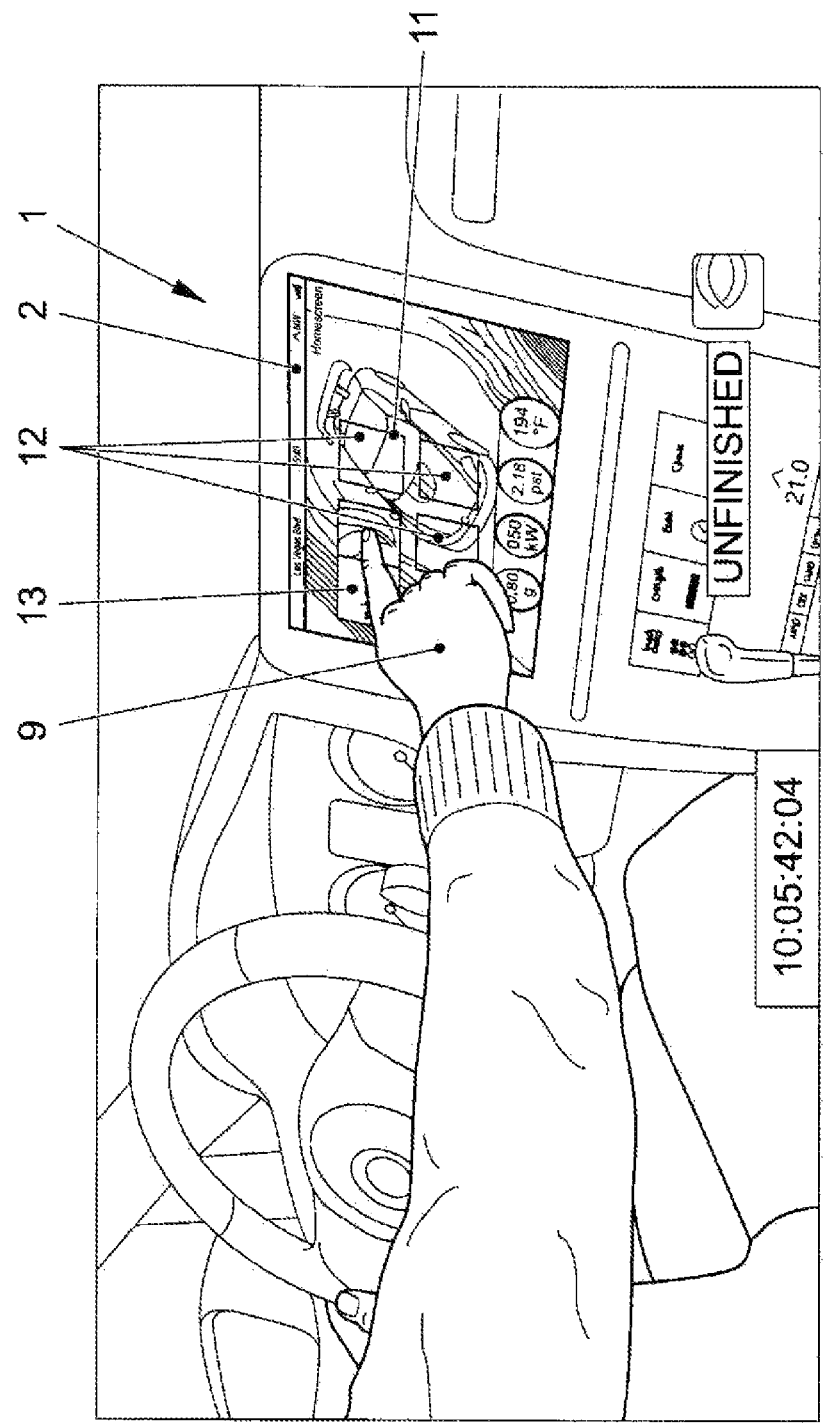
FIG. 15 is a perspective view of a user interface with tiles in an operator control mode.

FIG. 15 shows a user approaching and a subsequent longpress gesture of a user's hand 9 on the upper tile 13 on the screen 2. The approaching by the user brings about a display of a tile grid 11 which, in contrast to FIG. 2, illustrates positions of cells 12 which are adjacent to one another. In other words, the cells 12 of the tile grid 11 are not delimited from one another by lines but instead by strips of the wallpaper.

Figure 16:
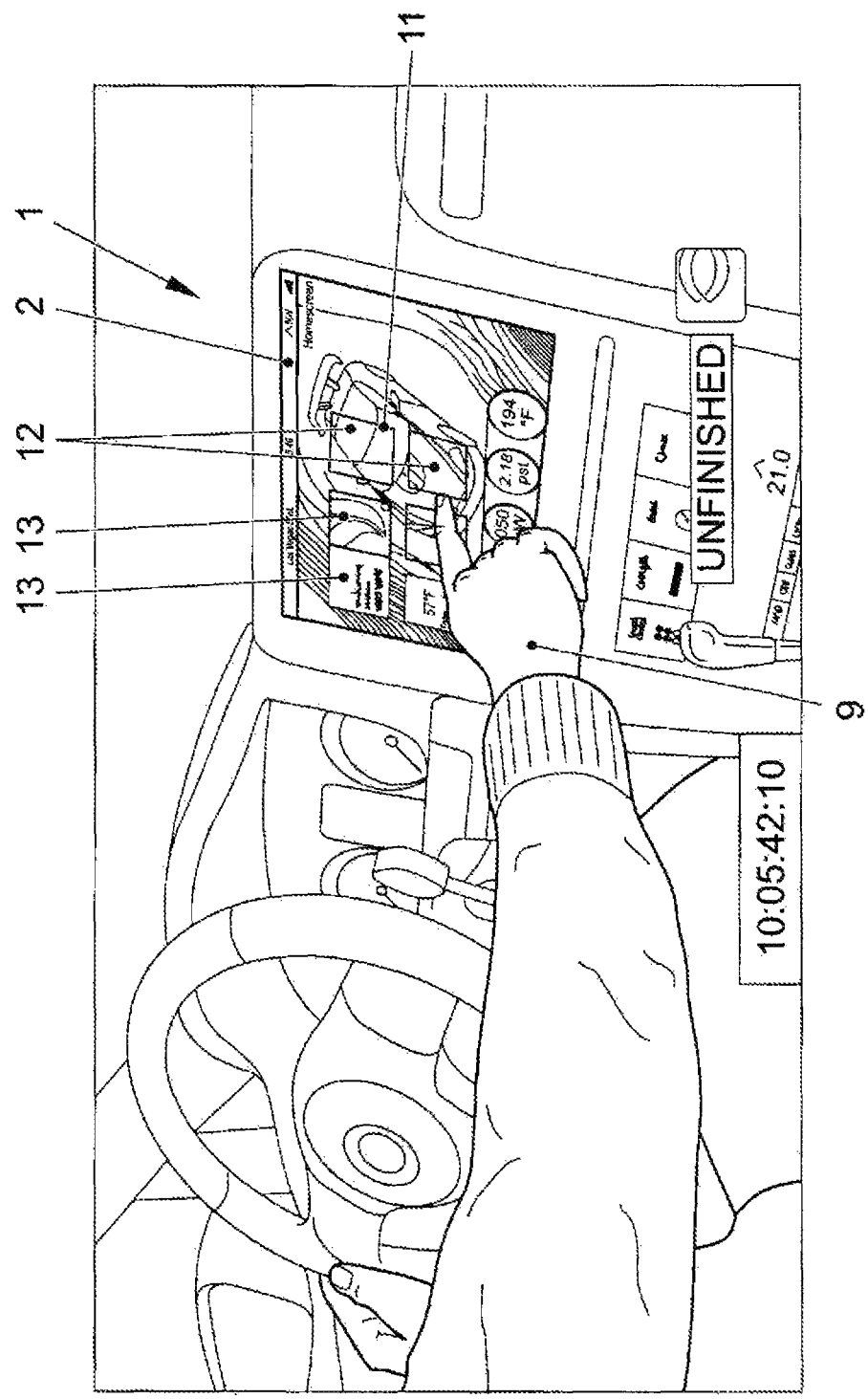
FIG. 16 is an illustration of a user input for newly positioning and for changing a size of a tile which has already been defined.

FIG. 16 shows the result of a swiping gesture relating to the top left tile 13 onto a position which is located essentially closest to all the previously unoccupied cells of the tile grid. In this way, a change is brought about in the size and the position of the tile 13 in such a way that the cells which are at the smallest distance from the illustrated target position represent the target positions of a newly defined tile. In other words, the previous positions of the shifted tile 13 are canceled and the two middle cells 12 which are arranged one on top of the other and the two rightmost cells 12 which are arranged one on top of the other are selected as common target position of the newly defined tile as soon as the user interrupts the contact with the surface of the screen 2 at the illustrated position.

Figure 17:
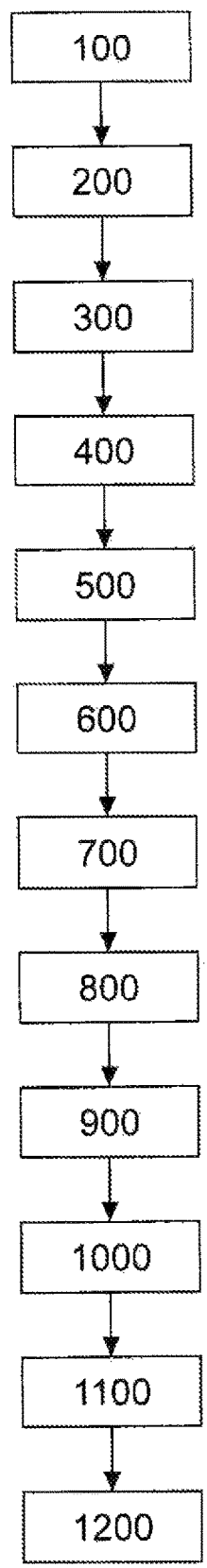
FIG. 17 is a flowchart illustrating steps of an exemplary embodiment of a method according to the present disclosure.

FIG. 17 shows steps of an exemplary embodiment of a method according to the present disclosure for defining a tile on a display device of a user interface of a means of transportation. In step 100, a user approaching the display device is detected. In step 200, a tile grid comprising a plurality of cells is subsequently displayed on the display device. In step 300, a user gesture in contact with a touch-sensitive surface relating to at least one cell is detected.

In response to ending of the contact with the touch-sensitive surface, in step 400 a tile is defined at the positions of those cells which have been significantly swiped over by means of the user gesture. In this context, slight swiping over underneath a predefined minimum degree is ignored. In step 500, a tapping gesture relating to the defined tile as described above is detected and in response thereto a selection menu for defining content to be displayed in the tile is displayed in step 600. In step 700, a selection gesture relating to an entry in the selection menu of the defined tile is detected and in response thereto in step 800 a selection submenu having entries which are thematically assigned to the entry in the selection menu is displayed. In response to a selection gesture relating to an entry in the selection submenu, in step 900 content which is assigned to the entry in the selection submenu is assigned to the tile. In step 1000, a gesture having a minimum contact duration ("longpress" gesture) relating to the defined tile is detected. In this way, the tile which has already been defined is detached from its current position, assigned to a respective current position of the user's finger and prepared for adaptation with respect to its position and size. In step 1100, a swiping gesture relating to the detached tile is detected and subsequently in step 1200 a new tile on the basis of the defined tile is defined as a function of that position of cells which have a predetermined relationship with the target position of the swiping gesture. In this context, a rectangle is defined by those cells of the tile grid whose edges form an envelope of the cells on which the detached and moved tile is superimposed. As a result, an intuitive and simple definition and repositioning as well as changing of the size of tiles can be carried out on a home screen of a screen of a user interface for a means of transportation.

Screens on which information and control buttons for operating a vehicle can be displayed are being increasingly installed in modern means of transportation (referred to below as "vehicle or vehicles"). On some occasions, functions or functional scopes or information scopes are combined in so-called "tiles" which the user can, where appropriate, adapt in respect of size, position and format. Configuration menus which have to be explicitly called by the user have been proposed for this method step. In the configuration menu itself, the user may not be able to operate the control buttons contained in the tiles in order to call the functional-scope-related or information-related functions. The configuration mode differs in this respect from a display mode and an operator control mode. Within the scope of the present disclosure, a "display mode" is understood to be a display modality in which the screen content is optimized for the displaying of the information which is contained in or in respect of esthetic criteria. In contrast, in the "operator control mode" greater value is placed on the fact that the user can recognize elements of the screen which he can control as opposed to elements which he cannot control. The functions which are assigned to the tiles in the operator control mode can also be referred to as "primary functions" which in computer-based operational systems can frequently be accessed by means of a click with a left-hand mouse button or a double click, while the functions which can be controlled in the configuration mode in the case of computer-based operating systems tend to be organization functions or configuration functions ("secondary functions") which are assigned to a right-hand click. DE 10 2008 048 825 A1 discloses a display/operator control system for a motor vehicle in which windows ("widgets") can be changed in respect of their size by means of a gripping gesture and optionally in respect of their position by means of drag/drop gestures. Freely selectable positions and sizes for tiles can considerably limit the esthetic appearance and the user orientation in screen-based menus.

Although the aspects according to the present disclosure and the associated embodiments have been described in detail on the basis of the exemplary embodiments illustrated in conjunction with the appended figures in the drawings, modifications and combinations of features of the illustrated exemplary embodiments are possible for a person skilled in the art without departing from the scope of the present invention, the scope of protection of which is defined by the appended claims.

LIST OF REFERENCE SYMBOLS

1 User interface
2 Screen
2a Screen
3 Infrared LED strip
4 Electronic control unit
5 Data memory
6 Loudspeaker
7a, 7b Ambient lighting strips
8a Driver's seat
8b Front seat passenger's seat
9 User's hand
10 Passenger car
11 Tile grid
12 Cell of the tile grid
13 Tile
14 Selection menu
15 Entries in the selection menu
16 Selection submenu
17 Entries in the selection submenu
100 to 1200 Method steps
P Arrow

The invention claimed is:

1. A method for enabling user-defining of one or more tiles on a display device of a transportation vehicle user interface system, the method comprising:
   displaying, on the display device, a tile grid comprising a plurality of cells in an operator control mode;
   receiving a user's swiping gesture engaged with a touch-sensitive surface of the display device along a swipe path, wherein the swipe path is an outlining of at least one cell of the plurality of cells; and
   defining a target tile on the display device at positions of the at least one cell according to the outlining in response to the outlining of the at least one cell, and automatically displaying a previously undisplayed selection menu for defining content to be displayed in the target tile, in response to the outlining of the at least one cell.

2. The method of claim 1, wherein the tile is defined at positions of the at least one cell captured within a maximum width extent and a maximum height extent of the outlining.

3. The method of claim 1, further comprising:
   detecting a tapping gesture relating to a defined tile; and
   in response thereto, displaying the selection menu for defining content to be displayed in the defined tile.

4. The method of claim 3, further comprising:
   detecting a selection gesture relating to an entry in the selection menu of the defined tile; and
   in response thereto assigning to the defined tile content which is assigned to the entry in the selection menu.

5. The method claim 4, wherein the selection gesture comprises one of:
   a tapping gesture on the entry; and
   a swiping gesture relating to the entry with a target of the defined tile.

6. The method of claim 4, further comprising:
   displaying a selection submenu having entries which are thematically assigned to the entry in the selection menu, and in response to a selection gesture relating to an entry in the selection submenu, assigning to the tile content which is assigned to the selection submenu entry.

7. The method of claim 1, further comprising:
   detecting a gesture having a minimum contact duration, on the defined target tile;
   detecting a swiping gesture relating to the defined target tile; and
   defining a new tile as a function of positions of cells which have a predetermined relationship with a target position of the swiping gesture.

8. The method of claim 7, wherein the predetermined relationship is defined within a distance of the target position from the cells which is less than half of an edge length or width of a cell.

9. The method of claim 7, wherein the predetermined relationship includes at least one of the new tile is assigned to positions of cells which correspond with the defined target tile, shifted to the target position of the swiping gesture, and at least partially have the defined target tile superimposed on them.

10. The method of claim 1, further comprising displaying the tile grid in response to at least one of:
   detecting a swiping gesture with a starting position on an already defined tile; and
   a user approaching the display device.

11. The method of claim 1, wherein the target tile is separated from one or more adjacent tiles by strips of a background.

12. The method of claim 1, wherein the cells of the tile grid are not delimited by lines.

13. The method of claim 1, wherein displaying the tile grid includes detecting approach of a user, and in response to detection of approach, revealing the tile grid.

14. The method of claim 1, further comprising, in response to a user's swiping gesture of the target tile onto a position of previously unoccupied cells, changing a size of the target tile such that each of the previously unoccupied cells are selected as common position of the target tile.

15. A user interface system of a transportation vehicle comprising:
   a display device including a touch sensitive surface;
   a detection unit; and
   an evaluation unit,
   wherein the user interface system is configured to carry out a method including:
      displaying, by the display device, a tile grid comprising a plurality of cells in an operator control mode,
      detecting a user's swiping gesture engaged with the touch-sensitive surface along a swipe path, wherein the swipe path is an outlining of at least one cell of the plurality of cells; and
      defining a target tile at positions of the at least one cell according to the outlining, in response to the outlining, and automatically displaying a previously undisplayed selection menu for defining content to be displayed in the target tile, in response to the outlining.

16. The user interface system of claim 15, wherein the user interface system is further configured to carry out a method in response to a user's swiping gesture of the target tile onto a position of previously unoccupied cells, changing a size of the target tile such that each of the previously unoccupied cells are selected as common position of the target tile.

17. A computer program product comprising instructions which, when executed on an evaluation unit of a user interface system of a transportation vehicle including a display device having a touch-sensitive surface, a detection unit, and the evaluation unit, cause the evaluation unit to carry out the steps of a method comprising:
   displaying, on the display device, a tile grid comprising a plurality of cells in an operator control mode,
   detecting a user's swiping gesture engaged with the touch-sensitive surface along a swipe path, wherein the swipe path is an outlining of at least one cell; and
   defining a target tile at positions of the at least one cell according to the outlining, in response to the outlining, and automatically displaying a previously undisplayed selection menu for defining content to be displayed in the target tile, in response to the outlining.

18. The computer program product of claim 17, the method further comprising in response to a user's swiping gesture of the target tile onto a position of previously unoccupied cells, changing a size of the target tile such that each of the previously unoccupied cells are selected as common position of the target tile.

19. A transportation vehicle comprising:
   a user interface system including a display device having a touch-sensitive surface, a detection unit, and an evaluation unit,
   wherein the user interface system is configured to display a tile grid comprising a plurality of cells on the display device in an operator control mode, detect a user's swiping gesture engaged with the touch-sensitive surface along a swipe path, where the swipe path is an outlining of at least one cell, and to define a target tile at positions of the at least one cell according to the outlining, in response to the outlining, and automatically displaying a previously undisplayed selection menu for defining content to be displayed in the target tile, in response to the outlining.

20. The transportation vehicle of claim 19, wherein the user interface system is configured to, in response to a user's swiping gesture of the target tile onto a position of previously unoccupied cells, change a size of the target tile such that each of the previously unoccupied cells are selected as common position of the target tile.

* * * * *